United States Patent Office 2,734,053
Patented Feb. 7, 1956

2,734,053

DIS- AND POLYAZO DYESTUFFS AND PROCESS OF PREPARATION

Philippe Grandjean and Willy Steinemann, Basel, and Walter Wehrli, Riehen, Switzerland, assignors to Sandoz A. G., Basel, Switzerland, a Swiss confederation No Drawing. Application November 16, 1953, Serial No. 392,488

Claims priority, application Switzerland November 21, 1952

12 Claims. (Cl. 260—147)

The present invention relates to new azo dyestuffs which are characterized by valuable properties.

The new dyestuffs according to the present invention correspond to the formula $R_1$—NH—CO—$Cx$=$Cy$—CH=$Cx$—CO—NH—$R_2$ wherein each of $R_1$—NH— and $R_2$—NH— stands for the radical of an aromatic amine containing from one to three azo groups, one to four water-solubilizing groups and zero to two of the metal atoms copper and nickel, and wherein $R_1$—NH— and $R_2$—NH— may be identical, $x$ is hydrogen or halogen and $y$ is hydrogen or lower alkyl.

These new dyestuffs are prepared, according to the present invention, by a process which involves condensing (a) two mols of an aromatic amine, containing one or more azo groups, which may be protected by metal atoms in complex combination, and/or a group which is capable of azo dyestuff formation or a substituent which is convertible into such a group, or (b) two mols of a mixture of two or more such aromatic amines in any desired proportions, with one mol of a butadiene-1,4-dicarboxylic acid halide or a derivative thereof which is substituted by halogen or alkyl, and then coupling the condensation products, when they contain groups capable of azo dyestuff formation or substitutents convertible into such groups, if desired after conversion of the substituents into groups capable of azo dyestuff formation, with suitable diazo compounds or diazotizing the said condensation products and combining them with suitable azo components, and thereafter carrying out any desired further coupling reactions, the components being so selected in this connection that a sufficient number of water-solubilizing groups are present in the final dyestuffs, and if desired treating the latter in substance or on the fiber with metal-yielding agents.

The new dyestuffs are suitably primarily for the dyeing of cotton and fibers of regenerated cellulose. Due to the abundance of conjugated double bonds therein, the dyestuffs possess outstanding affinity for these fibers. By suitable selection of the starting materials, dyestuffs are obtained which are also suitable for dyeing animal fibers, leather and synthetic polyamide fibers. When they are prepared from two mols of a single amine and one mol of a butadiene-1,4-dicarboxylic acid halide, they are symmetrical products and correspond to the formula R'—NH—CO—CH=CH—CH=CH—CO—NH—R'
(a)

wherein the butadiene radical may be substituted by halogen or alkyl, and each R'—NH— stands for the same radical of an aromatic amine which contains at least one azo group and a sufficient number of water-solubilizing groups to assure water-solubility to the final dyestuff.

On the other hand, when two mols of a mixture, in any desired proportions, of two or more different aromatic amines, which contain one or more azo groups which may be protected by metal atoms in complex combination and/or a group which is capable of azo dyestuff formation or a substituent which is convertible into such a group, are combined with one mol of a butadiene-1,4-dicarboxylic acid halide, then mixtures of end dyestuffs are obtained. Two different starting materials in the molecular proportion of 1:1 generally yield three end products, namely two symmetrical products and one unsymmetrical product, which contains the two starting materials and corresponds to the formula R''—NH—CO—CH=CH—CH=CH—CO—NH—R''
(b)

wherein the butadiene radical may be substituted by halogen or alkyl, and the two R''—NH— moieties are different radicals of aromatic amines which contain at least one azo group and a sufficient number of water-solubilizing groups to assure water-solubility to the end dyestuffs. The proportion of the three dyestuffs in the final product changes when the mol proportion of the starting materials is changed from 1:1 or when more than two starting substances are used. By selecting the starting materials and the mol proportions in which they are employed, end products with outstanding properties with regard to solubility in water, solubility in the dyebath, fastness to light and fastness to wet treatments are obtained. The optimum properties can advantageously be determined, as regards any particular starting materials by a series of tests with systematically changed mol proportions. It has been found that dyestuff mixtures, obtained from a mixture of starting materials, generally have the same dyeing properties as the homogeneous dyestuffs.

By amines which contain azo groups protected by metal atoms in complex combination, are meant the metal complex compounds of aminoazo dyestuffs which contain for example one or more ortho, ortho'-dihydrox- or ortho-hydroxy-ortho'-alkoxy- or -carboxy-azo grouping. The metals in complex combination are preferably copper or nickel.

It is possible, within the scope of the foregoing to combine the butadiene-1,4-dicarboxyl acids with amines or aminoazo compounds which, in addition to the amino group to be condensed also contain a group capable of azo dyestuff formation or a substituent which is convertible into such a group, and to carry out further coupling reactions with the condensation products obtained with such amines or aminoazo compounds. Groups of this character which are capable of azo dyestuff formation or substituents which are convertible into such groups are for example the couplable CH group and substituents which are convertible into diazotizable amino groups such as the nitro group or a readily saponifiable acylamino group.

In preparing the dyestuffs according to the invention, the starting materials—preferably in the form of the alkali salts—are dissolved in water, and then the butadiene-1,4-dicarboxylic acid halide, which may be dissolved in a solvent such for example as carbon tetrachloride, chloroform, chlorobenzene, methylbenzene or 1,2-dichlorobenzene, is slowly added while stirring thoroughly. The quantity of alkali necessary for neutralization of the resultant hydrogen halide is run in preferably in the form of an aqueous solution of an alkali hydroxide or carbonate or acetate or borate. The liberated acid can also be disposed of by means of a buffer, such for example as sodium bicarbonate. The dyestuff which is produced is precipitated from the solution by salting out or by the addition of an acid if necessary with the aid of heat and after preliminary distillation of the organic solvent. The precipitated dyestuff is then isolated by filtration and, if necessary, after conversion into an alkali salt, is dried.

If groups which are capable of metal complex formation are introduced by the aminoazo compounds or in the building up of the dyestuff, the end products can be converted into metal complex compounds in substance or on the fiber by treatment with metal-yielding agent.

which has a distinct alkaline reaction, there is added at 10–15° and in the course of 4–5 hours, a 10% benzene solution of 2 - methylbutadiene - 1,4 - dicarboxylic acid chloride until free amino group can no longer be detected in the condensation mass. The thus-produced disazo dyestuff is isolated and dried. It corresponds to the formula

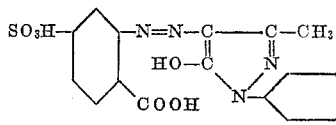 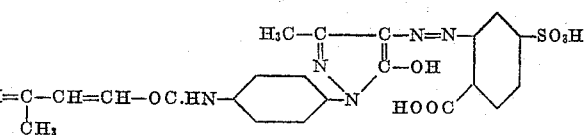

The metal complex compounds generally possess enhanced fastness to light and improved fastness to wet treatments, as compared with the unmetallized dyestuffs. Here again the preferred metals are copper and nickel.

The following examples illustrate the invention without limiting the same. In such examples the parts are parts by weight, the percentages are percentages by weight and the temperatures are given in degrees centigrade. The term "soda" refers to sodium carbonate.

EXAMPLE 1

46.4 parts of the aminoazo compound, prepared by coupling diazotized 2-aminonaphthalene-4,8-disulfonic acid with 1-amino-3-acetylaminobenzene, are dissolved neutral in water at room temperature (e. g. 20–30°) with the addition of aqueous sodium hydroxide solution. Into the resultant solution, there is slowly added dropwise, and while stirring very thoroughly, a 10% benzene solution of butadiene - 1,4 - dicarboxylic acid chloride until the presence of free amino group can no longer be detected in the condensation mass. During this operation, the reaction solution is maintained constantly weakly alkaline by running in a 10% aqueous sodium carbonate solution. The thus-formed disazo dyestuff is precipitated at 60–80° with the aid of sodium chloride, after which it is filtered and dried. It corresponds to the formula

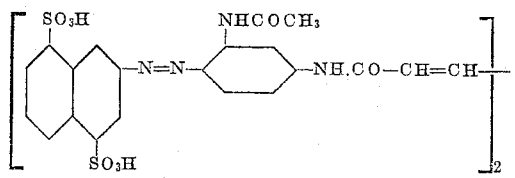

and is a yellow-brown powder which dissolves with yellow coloration in water and with scarlet-red coloration in concentrated sulfuric acid. It dyes cotton and fibers of regenerated cellulose in clear yellow shades of very good dischargeability and fastness to light.

EXAMPLE 2

41.7 parts of the aminomonoazo compound, prepared from diazotized 1-carboxy-2-aminobenzene-4-sulfonic acid and 1-(4'-amino)-phenyl-3-methyl-5-pyrazolone, are dissolved in 2500 parts of water with the addition of excess sodium carbonate. To the resultant solution, and is an orange-brown powder which dissolves with yellow coloration in water and in concentrated sulfuric acid. Its yellow dyeings on cotton or fibers of regenerated cellulose are of excellent fastness to light and wet treatments, particularly if they are treated with copper-yielding agents.

EXAMPLE 3

34 parts of the aminomonoazo compound, prepared by coupling diazotized 1-carboxy-2-aminobenzene-5-sulfonic acid with 1-(4''-amino-1',1''-stilbenyl-4')-3-methyl-5-pyrazolone-2',2''-disulfonic acid, are dissolved neutral in 1000 parts of hot water, and then are converted into the copper complex compound by the addition of 62 parts of a 20% aqueous copper sulfate solution in the presence of aqueous sodium acetate. The dyestuff solution is then rendered alkaline by the addition of excess sodium bicarbonate and is cooled with ice to 10–15°. At the latter temperature there is added to the dyestuff solution, in the course of 2–3 hours and while stirring very thoroughly, a 10% solution of 1,4-dichlorobutadiene-1,4-dicarboxylic acid chloride in chlorobenzene until free amino group can no longer be detected. The thus-formed disazo dyestuff is—after being isolated, dried and ground—a brown powder which corresponds to the formula

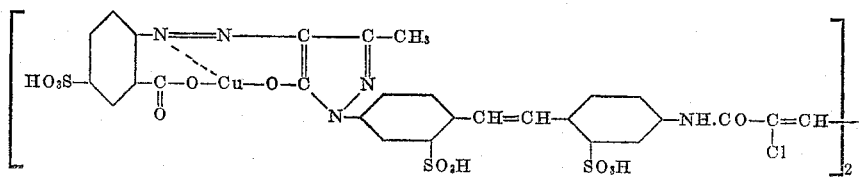

and dissolves with yellow coloration in water and concentrated sulfuric acid. Its dyeings on cotton and fibers of regenerated cellulose are of excellent fastness to light and to wet treatments.

The same disazo dyestuff is obtained when, while otherwise proceeding as described in the foregoing paragraph, the aminomonoazo compound of the example is first condensed with 1,4-dichlorobutadiene-1,4-dicarboxylic acid chloride, and the copper complex compound only thereafter prepared from the condensation product.

The following table sets forth additional disazo and polyazo dyestuffs which can be prepared after the manner described in the foregoing examples and which are suitable for use in the dyeing of cotton and fibers of regenerated cellulose. To characterize the said disazo and polyazo dyestuffs, columns I and II list the two aminoazo compounds which are bound together by means of the butadiene-1,4-dicarboxylic acid halide. Column III indicates the type of resultant dyestuff and column IV sets forth the shade of the dyeings obtained therewith; where metallizable disazo and polyazo dyestuffs are involved the shade is of dyeings obtained with the coppered product.

Table

| Example No. | I | II | III | IV |
|---|---|---|---|---|
| 4 | 1 mol of (2-aminonaphthalene-4,8-disulfonic acid ⟶ 1-amino-2-methylbenzene). | 1 mol of (2-aminonaphthalene-6,8-disulfonic acid ⟶ 1-amino-3-ethylbenzene). | dischargeable dyestuff | yellow. |
| 5 | 0.6 mol of (1-aminonaphthalene-3,6-disulfonic acid ⟶ 1-amino-3-formylaminobenzene). | 1.4 mols of (2-aminonaphthalene-5,7-disulfonic acid ⟶ 1-amino-2,5-dimethylbenzene). | ...do... | Do. |
| 6 | 1 mol of (2-aminonaphthalene-4,8-disulfonic acid ⟶ 1-amino-3-benzoylaminobenzene). | 1 mol of (2-aminonaphthalene-4,8-disulfonic acid ⟶ 1-amino-2,5-diethoxybenzene). | ...do... | Do. |
| 7 | 1 mol of (mixture of 3-aminopyrene-5,8-disulfonic acid and 3-aminopyrene-5,10-disulfonic acid ⟶ 1-amino-3-methylbenzene). | same as I | ...do... | yellow-brown. |
| 8 | 1 mol of (4-amino-1,1'-azobenzene-3,4'-disulfonic acid ⟶ 1-amino-3-methylbenzene). | same as I | ...do... | Do. |
| 9 | 0.8 mol of (4-amino-1,1'-azobenzene-3,4'-disulfonic acid ⟶ 1-amino-2-methoxy-5-methylbenzene). | 1.2 mols of (2-aminonaphthalene-4,8-disulfonic acid ⟶ 1-amino-3-methoxybenzene). | ...do... | orange. |
| 10 | 1 mol of (2-aminonaphthalene-6,8-disulfonic acid ⟶ 1-amino-3-methylbenzene ⟶ 1-amino-3-methylbenzene ⟶ 1-amino-2-methoxy-5-methylbenzene). | 1 mol of (2-aminonaphthalene-6,8-disulfonic acid ⟶ 1-amino-3-acetylaminobenzene ⟶ 1-amino-3-methylbenzene). | ...do... | reddish brown. |
| 11 | 1 mol of (1-aminobenzene-4-sulfonic acid ⟶ 1-aminonaphthalene-6-sulfonic acid ⟶ 1-amino-3-methylbenzene). | 1 mol of (4-amino-1,1'-azobenzene-3,4'-disulfonic acid ⟶ 1-amino-3-methylbenzene). | ...do... | yellowish brown. |
| 12 | 0.4 mol of (3-aminopyrene-4-sulfonic acid ⟶ 1-amino-3-methylbenzene). | 1.6 mols of (2-aminonaphthalene-4,8-disulfonic acid ⟶ 1-amino-2-methoxy-5-methylbenzene). | ...do... | yellowish orange. |
| 13 | 0.4 mol of 4-amino-1,1'-azobenzene-4'-sulfonic acid. | 1.6 mols of (2-aminonaphthalene-6,8-disulfonic acid ⟶ 1-amino-3-methylbenzene). | ...do... | greenish yellow. |
| 14 | 1 mol of (2-aminonaphthalene-4,8-disulfonic acid ⟶ 1-amino-3-acetylaminobenzene). | 1 mol of (aminobenzene ⟶ 1-aminonaphthalene-6-sulfonic acid ⟶ 1-aminonaphthalene-6-sulfonic acid ⟶ 2-amino-8-hydroxynaphthalene-6-sulfonic acid). | ...do... | greenish olive. |
| 15 | 1 mol of 2-acetylamino-4-amino-4'-hydroxy-1,1'-azobenzene-3'-carboxylic acid. | same as I | aftercoppering dyestuff | yellow. |
| 16 | 0.5 mol of (1-carboxy-2-aminobenzene-4-sulfonic acid ⟶ 1-[3'-amino]-phenyl-3-methyl-5-pyrazolone). | 1.5 mols of (1-carboxy-2-aminobenzene-5-sulfonic acid ⟶ 1-[4'-amino]-phenyl-3-methyl-5-pyrazolone). | ...do... | Do. |
| 17 | 1 mol of (1-hydroxy-2-[4'-amino]-benzoylamino-6-carboxybenzene-4-sulfonic acid ⟶ 1-amino-3-methylbenzene). | 1 mol of (1-carboxy-2-amino-benzene-5-sulfonic acid ⟶ 1-[4'-amino]-phenyl-3-methyl-5-pyrazolone). | ...do... | Do. |
| 18 | 1 mol of (2-amino-5-nitrobenzene-1-carboxylic acid ⟶ 1-phenyl-3-methyl-5-pyrazolone-3'-sulfonic acid and reduction). | same as I | ...do... | reddish yellow. |
| 19 | 1 mol of (2-amino-5-nitrobenzene-1-carboxylic acid ⟶ 1-hydroxynaphthalene-3,6-disulfonic acid and reduction). | same as I | copper complex | bluish red. |
| 20 | 1 mol of (1-amino-2-hydroxy-6-nitro-naphthalene-4-sulfonic acid ⟶ 1-phenyl-3-methyl-5-pyrazolone-3'-sulfonic acid and reduction). | same as I | after coppering dyestuff | red. |
| 21 | 1 mol of (1-hydroxy-4-[4'-amino]-benzoylamino-6-carboxybene-2-sulfonic acid ⟶ 1-amino-3-methylbenzene). | 1 mol of (1-hydroxy-4-amino-6-carboxybenzene-2-sulfonic acid ⟶ 1-amino-3-acetyl-aminobenzene). | ...do... | reddish yellow. |
| 22 | 1 mol of 4-amino-4'-hydroxy-1,1'-azobenzene-3'-carboxylic acid. | 1 mol of (1-hydroxy-4-amino-6-carboxybenzene-2-sulfonic acid ⟶ 1-amino-3-methyl-benzene). | ...do... | greenish yellow. |
| 23 | 1 mol of (1-hydroxy-4-amino-6-carboxybenzene-2-sulfonic acid ⟶ 1-amino-3-acetylaminobenzene). | 1 mol of (1-hydroxy-2-[4'-amino]-benzoylamino-6-carboxybenzene-4-sulfonic acid ⟶ 1-amino-3-methylbenzene ⟶ 1-amino-3-methylbenzene). | ...do... | reddish yellow. |
| 24 | 0.7 mol of (1-hydroxy-2-amino-6-chloro-alkaline benzene-4-sulfonic acid ⟶ 2-amino-5-hydroxynaphthalene-7-sulfonic acid). | 1.3 mols of (1-hydroxy-2-amino-6-chlorobenzene-4-sulfonic acid ⟶ 1-[4''-amino-1',1''-stilbenyl-4']-3-methyl-5-pyrazolone-2',2''-disulfonic acid). | copper complex | brown-yellow. |
| 25 | 1 mol of (1-carboxymethoxy-2-aminobenzene ⟶ 2-amino-5-hydroxynaphthalene-7-sulfonic acid). | 1 mol of copper complex compound of (1-hydroxy-2-aminobenzene-4,6-disulfonic acid ⟶ 2-amino-5-hydroxy-naphthalene-7-sulfonic acid). | ...do... | bordeaux-red. |
| 26 | 1 mol of (1-methoxy-2-amino-5-nitrobenzene ⟶ 1,8-dihydroxynaphthalene-3,6-disulfonic acid and reduction). | same as I | ...do... | reddish blue. |
| 27 | 0.4 mol of (2-aminobenzene-1-carboxylic acid ⟶ 1-[4''-amino-1',1''-stilbenyl-4']-3-methyl-5-pyrazolone-2',2''-disulfonic acid ⟶ 1-amino-3-methylbenzene). | 1.6 mols of (1-carboxy-2-aminobenzene-5-sulfonic acid ⟶ 1-[4''-amino-1',1''-stilbenyl-4']-3-methyl-5-pyrazolone-2',2''-disulfonic acid ⟶ 1-amino-3-methylbenzene). | nickel complex | reddish yellow. |
| 28 | 0.9 mol of copper complex of (1-carboxy-2-aminobenzene-5-sulfonic acid ⟶ 1-amino-4-acetoacetylaminobenzene). | 1.1 mols of (1-hydroxy-2-[4'-amino]-benzoylamino-6-carboxybenzene-4-sulfonic acid ⟶ 1-amino-3-propionyl-aminobenzene). | aftercoppering dyestuff | yellow. |
| 29 | 1 mol of (1-carboxy-2-aminobenzene-5-sulfonic acid amide ⟶ 1-[4'-amino]-phenyl-3-methyl-5-pyrazolone). | 1 mol of 4-amino-3'-carboxy-4'-hydroxy-1,1'-azobenzene-5'-sulfonic acid. | ...do... | Do. |
| 30 | 1 mol of (1-carboxy-2-aminobenzene-5-sulfonic acid methylamide ⟶ 1-[4''-amino-1',1''-stilbenyl-4']-3-methyl-5-pyrazolone-2',2''-disulfonic acid). | same as I | copper complex | Do. |
| 31 | 0.7 mol of copper complex of (3,3'-dimethoxy-4,4'-diamino-1,1'-diphenyl ⇌ 1-amino-8-hydroxynaphthalene-3,6-disulfonic acid). | 1.3 mols of copper complex of (1-carboxy-2-aminobenzene-5-sulfonic acid ⟶ 1-[4''-amino-1',1''-stilbenyl-4']-3-methyl-5-pyrazolone-2',2''-disulfonic acid). | ...do... | green. |
| 32 | 1 mol of (1-hydroxy-2-[4'-amino]-benzoylamino-6-carboxybenzene-4-sulfonic acid ⟶ 1-amino-3-methylbenzene). | same as I | aftercoppering dyestuff | yellow. |

The formula of representative dyestuffs of the aforesaid table are as follows:

EXAMPLE 8

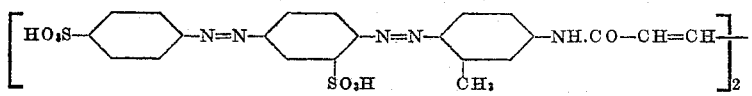

EXAMPLE 17

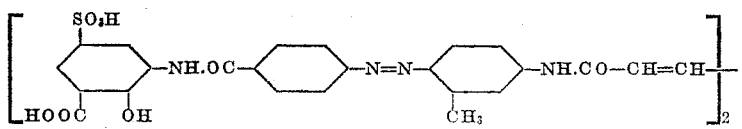

EXAMPLE 20

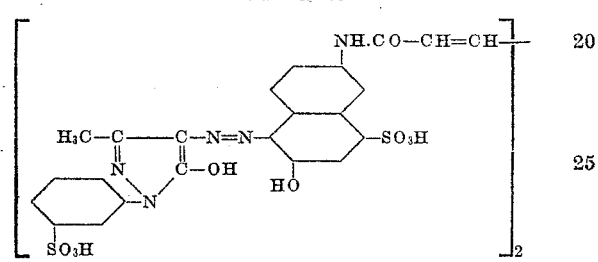

EXAMPLE 33

58 parts of symmetrical butadiene-1,4-dicarboxylic acid-[5-hydroxy-7-sulfonaphthyl-(2)]-amide, in the form of the disodium salt, are dissolved in 800 parts of warm water. 60 parts of crystalline sodium acetate are added to the solution, which is then cooled to 0–5°. There is then added to the resultant solution, while stirring thoroughly, an ice-cold diazo suspension obtained by the indirect diazotization of 72 parts of 1-hydroxy-2-(4'-amino)-benzoylamino-6-carboxybenzene-4-sulfonic acid in conventional manner. The weakly acid suspension is then neutralized by the dropwise addition of an aqueous sodium bicarbonate solution over a period of 4–5 hours until a brilliant yellow alkaline reaction is achieved, whereupon after the coupling has ended, the obtained solution is heated to approximately 90°, the produced disazo dyestuff salted out, filtered off and dried. It corresponds to the formula

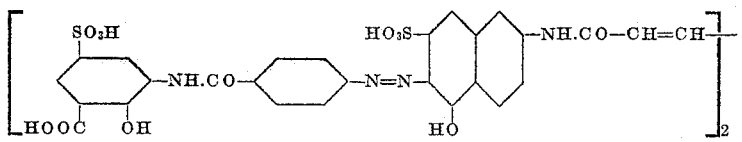

and is a dark powder which dissolves with red coloration in water and which dyes cotton and fibers of regenerated cellulose in red shades. The dyeings possess good fastness properties; these properties can be somewhat improved by aftertreatment with copper-yielding agents.

In order to prepare the symmetrical butadiene-1,4-dicarboxylic acid-[5-hydroxy-7-sulfonaphthyl-(2)]-amide, 239 parts of 2-amino-5-hydroxynaphthalene-7-sulfonic acid and 40 parts of crystalline sodium acetate are dissolved in 2000 parts of water. Thereupon a 10% solution of butadiene-1,4-dicarboxylic acid chloride in benzene is added to the solution, in the course of 3–4 hours and while stirring thoroughly, until no free amino group can be detected. The condensation mass is then heated to 70–80°, and the reaction product isolated therefrom and dried.

EXAMPLE 34

84.8 parts of 2-hydroxy-3,5'-dicarboxy-4'-amino-1,1'-diphenylurea-5-sulfonic acid are diazotized and gradually added to a solution of 58 parts of butadiene-1,4-dicarboxylic acid-[5-hydroxy-7-sulfonaphthyl-(2)]-amide in 1500 parts of water, 500 parts of pyridine and 100 parts of aqueous ammonia of 25% strength. The coupling is over in about 12 hours and the resultant diasazo dyestuff is salted out, filtered and dried. It corresponds to the formula

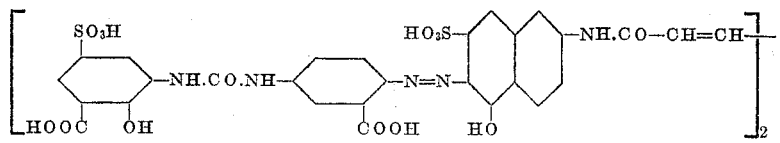

and dyes cotton fibers of regenerated cellulose in the aftercoppering process in bordeaux-red shades of very good fastness to light and to washing.

For conversion thereof into the copper complex compound, 140 parts of the dyestuff are dissolved at 80–85° in 3000 parts of water and 60 parts of crystalline sodium acetate and 70 parts of concentrated acetic acid are then added to the solution. Thereupon a solution of 50 parts of crystalline copper sulfate in 200 parts of water is run in gradually, after which the temperature is maintained for an hour at 80–85°. The resultant copper complex compound separates as the sodium salt, and is filtered and dried. It is a dark powder which dyes cotton and fibers of regenerated cellulose in bordeaux-red shades of very good fastness to light and of good fastness to washing.

The fastness to wet treatments is improved by aftertreatment on the fiber with copper salts.

EXAMPLE 35

19.5 parts of the diamine, obtained by the condensation of two mols of 2-nitro-5-aminobenzene-1-carboxylic acid with one mol of butadiene-1,4-dicarboxylic acid chloride and reduction of the nitro group to the amino group, are dissolved in water with the addition of aqueous sodium hydroxide solution, after which 6.9 parts of sodium nitrite are added. The solution is slowly introduced into a mixture of 40 parts of 30% hydrochloric acid and 100 parts of ice, in such manner that the final temperature of the mixture is between 5 and 10°. Upon completion of the ensuing tetrazotization, the suspension of the precipitated tetrazo compound is run, in the course of 30 minutes, into an alkaline solution of 25.4 parts of 1-phenyl-3-methyl-5-pyrazolone-4'-sulfonic acid. The reaction of the mass is maintained constantly alkaline by the addition of sodium carbonate in small portions. Coupling takes place acid coupling of 800 parts of diazotized 4-nitro-4'-amino-1,1'-stilbene-2,2'-disulfonic acid with 274 parts of 1-amino-2-methoxy-5-methylbenzene, are diazotized and then coupled with a soda-alkaline solution of 584 parts of butadiene-1,4-dicarboxylic acid-[5-hydroxy-7-sulfonaphthyl-(2)]-amide. The resultant tetrakisazo dyestuff is salted out and filtered. Its copper complex compound corresponds to the formula

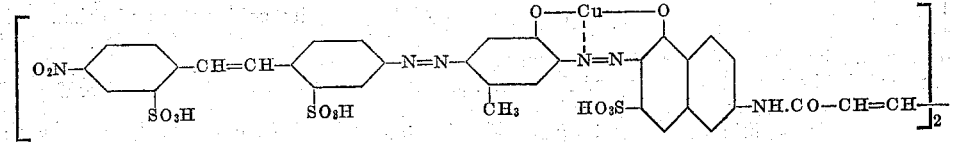

rapidly; after about 2 hours the solution containing the formed disazo dyestuff is heated to 70°, and the dyestuff salted out therefrom, filtered and dried. It corresponds to the formula

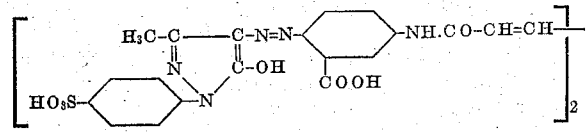

and is an orange-yellow powder which dissolves with yellow coloration in concentrated sulfuric acid and in water.

and dyes cotton and fibers of regenerated cellulose in greenish gray shades of good fastness to light and washing. Its fastness to wet treatments is improved by aftertreatment on the fiber with copper salts.

EXAMPLE 38

21 parts of butadiene-1,4-dicarboxylic acid-[4''-acetoacetylamino-2'',2''-disulfo-1',1''-stilbenyl-(4')]-amide are dissolved in 1000 parts of water with the aid of an excess of sodium carbonate, and then coupled at 0-2° with a diazo solution prepared from 5.6 parts of 2-aminobenzene-1-carboxylic acid. The formed disazo dyestuff is precipitated, filtered and dried. It is a yellow powder which corresponds to the formula

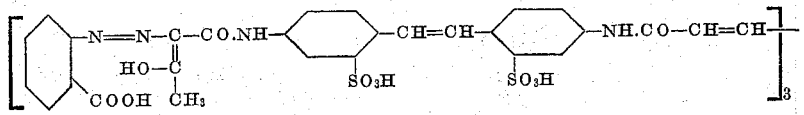

Its coppered dyeings on cellulose fibers are yellowish orange; dyeings of the same shade are obtained with the copper complex compound prepared in substance. The dyeings are characterized by excellent fastness to light and good fastness to wet treatments.

EXAMPLE 36

24.4 parts of 4,4'-diamino-3,3'-dimethoxy-1,1'-diphenyl are tetrazotized and coupled with a solution of 30.4 parts of 1-hydroxynaphthalene-3,8-disulfonic acid at 0° in a medium rendered alkaline with sodium carbonate. The resultant diazoazo compound is separated by filtration and, after the addition of pyridine, is further coupled with a solution of the copper complex compound of the intermediate obtained by the soda-alkaline coupling of 22.3 parts of diazotized 1-hydroxy-2-amino-6-chlorobenzene-4-sulfonic acid with 58 parts of butadiene-1,4-dicarboxylic acid-[5-hydroxy-7-sulfonaphthyl-(2)]-amide. The thus-formed dyestuff is precipitated from the solution by means of sodium chloride, is separated by filtration and is subjected to demethylating coppering. The resultant copper-containing dyestuff corresponds to the formula and dissolves with yellow coloration in concentrated sulfuric acid. Its coppered dyeings on cellulose fibers are greenish yellow and possess very good fastness to wet treatments and to light.

EXAMPLE 39

33 parts of butadiene-1,4-dicarboxylic acid-[3''-sulfo-4''-amino-1',1''-diphenyl-(4')]-amide, in the form of the disodium salt, are dissolved in 400 parts of water. To the resultant solution, there are then added 6.9 parts of sodium nitrite and a sufficient quantity of ice to bring the temperature of the mass down to 5°. At this temperature and in the course of 20-30 minutes, 80 parts of 15% hydrochloric acid are then added dropwise. The thus-acidified tetrazo suspension is stirred for about 3 hours at 5°, after which excess nitrous acid is decomposed by means of urea or aminosulfonic acid, and the suspension then slowly added to an ice-cold solution of 25 parts of 1-acetoacetylamino-4-hydroxybenzene-3-carboxylic acid and 500 parts of water, the last-named solution containing an excess of sodium carbonate. Upon completion of the ensuing coupling the reaction mass is

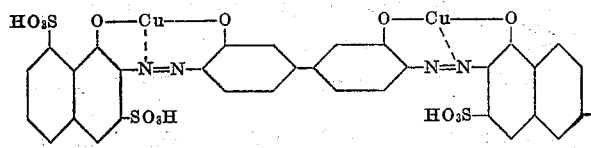 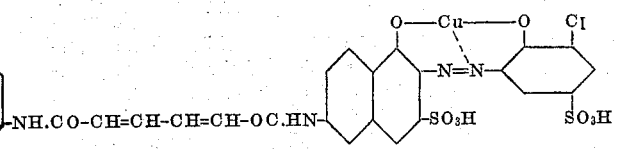

and dyes cotton and fibers of regenerated cellulose in blue shades of very good fastness to light and of good fastness to washing. The fastness to wet treatments is improved by aftertreatment on the fiber with copper salts.

EXAMPLE 37

1096 parts of the aminoazo compound, obtained by the heated to 70-80°, after which the resultant disazo dyestuff is isolated. Dried and ground, it is an olive-brown powder which corresponds to the formula

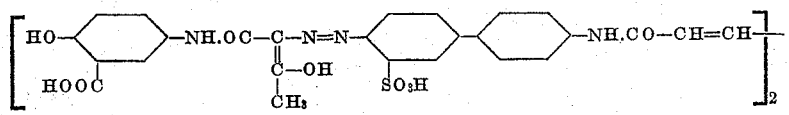

and dissolves with yellow coloration in water. Its dyeings on cotton and fibers of regenerated cellulose, treated with copper-yielding agents, are yellow and have good fastness properties.

EXAMPLE 40

46 parts of 1-carboxy-2-aminobenzene-5-sulfonic acid-methylamide are diazotized and coupled in soda-alkaline solution with 104 parts of the dipyrazolone of the formula

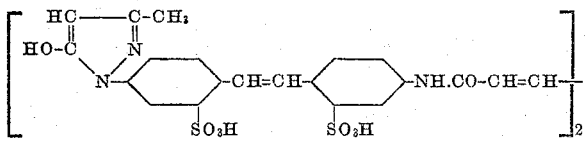

which can be prepared in a manner analogous to that set forth in the second paragraph of Example 33. Upon completion of the coupling, the reaction mass is heated and, after the addition of a small quantity of sodium chloride is boiled until the dyestuff pulp has been converted into a readily filterable precipitate. The latter is filtered hot, and is then dried.

To convert the disazo dyestuff into the nickel complex compound, 50 parts of the disazo dyestuff are dissolved in 2000 parts of water. To the resultant solution, there are first added 30 parts of crystalline sodium acetate and then, at about 70° and in the course of 20–30 minutes, a 10% aqueous nickel sulfate solution until a permanent excess of nickel(II)-ions can be detected. The formed nickel complex compound which corresponds to the formula

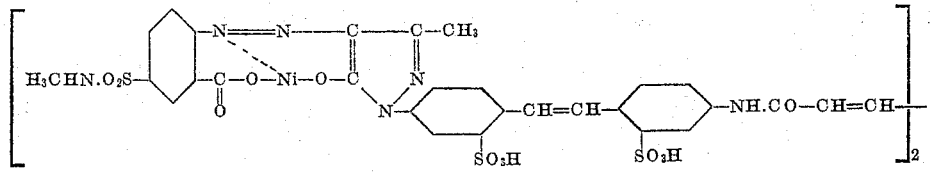

is precipitated from the solution by the addition of sodium chloride and is then filtered and dried. It dyes cotton and fibers of regenerated cellulose in yellow shades of good fastness to light and to wet treatments.

EXAMPLE 41

79 parts of the amino intermediate obtained by the condensation of 0.095 mol of 2-amino-5-hydroxynaphthalene-7-sulfonic acid and 0.105 mol of 4-nitro-4'-amino-1,1'-stilbene-2,2'-disulfonic acid with 0.105 mol of butadiene-1,4-dicarboxylic acid chloride and reduction of the nitro group to the amino group, are dissolved in 300 parts of water with the addition of sodium carbonate and then coupled in soda-alkaline solution with 22.3 parts of diazotized 1-hydroxy-2-amino-6-chlorobenzene-4-sulfonic acid, to form the monoazo dyestuff. The latter is salted out with sodium chloride and filtered. For diazotization thereof, 101 parts of the obtained aminoazo compound are dissolved in 300 parts of water, 7 parts of sodium nitrite are added to the solution, and the latter adjusted to a mineral acid reaction by the addition of 70 parts of 30% hydrochloric acid at 10–15° while stirring thoroughly. The resultant suspension of the diazoazo compound is then gradually added to an aqueous solution of 17.4 parts of 1-phenyl-3-methyl-5-pyrazolone, said solution containing sodium hydroxide. The formed disazo dyestuff is salted out, filtered and, after reprecipitation from water and re-filtering, dried. It is a dark powder which corresponds to the formula

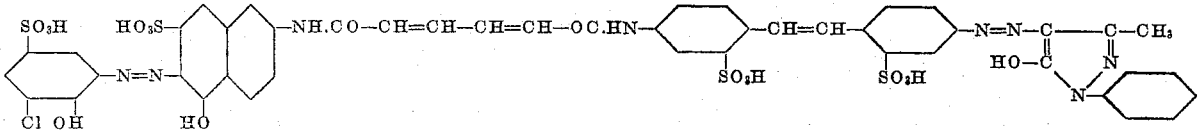

and dyes cotton and fibers of regenerated cellulose by the after coppering process in red shades of very good fastness to light and good fastness to washing.

EXAMPLE 42

100 parts of cotton are entered at 80° into a dyebath containing a solution of 1 part of anhydrous sodium carbonate, 0.5 part of the dyestuff obtained according to Example 1 and 2000 parts of water. The dyebath is slowly heated to boiling and then, after the addition of 20 parts of anhydrous sodium sulfate, is allowed to cool slowly to 70°. The dyed material is withdrawn, washed with cold water and dried. There is obtained a yellow dyeing of excellent fastness to light and of excellent dischargeability.

EXAMPLE 43

2 parts of the dyestuff described in Example 2 and 30 parts of sodium sulfate are dissolved in 3000 parts of water at 40–50°. 100 parts of cotton are then entered into the thus-prepared dyebath. The bath is heated to boiling in the course of ½ hour, maintained at this temperature for ¼ hour and then allowed to cool for ¼ hour. The dyed cotton is withdrawn and thoroughly rinsed.

For aftercoppering, the dyed material is moved about for ½ hour at 70° in a solution of 2 parts of crystalline copper sulfate, 2 parts of concentrated acetic acid and 3000 parts of water. The material is then again rinsed and finally dried.

EXAMPLE 44

2 parts of the copper complex compound obtained according to Example 3, first paragraph, are used for dyeing cotton after the manner described in the first paragraph of Example 43. The dyeing is characterized by excellent fastness to light and to wet treatments.

EXAMPLE 45

A printing paste consisting of 20 parts of the disazo dyestuff of Example 1, 305 parts of hot water, 500 parts of a thickening agent (for example gum tragacanth 6%), 100 parts of urea, 40 parts of thiodiethyleneglycol, 10 parts of an anion-active wetting agent, 15 parts of disodium phosphate and 10 parts of crystalline sodium chlorate is used for printing on viscose fabric. The print is dried, steamed for 1 hour at 100–102°, then rinsed with cold water, and dried.

Having thus disclosed the invention, what is claimed is:

1. A water-soluble azo dyestuff which corresponds to the formula $R_1$—NH—CO—C$x$=C$y$—CH=C$x$—CO—NH—$R_2$ wherein each of $R_1$—NH— and $R_2$—NH— is the radical of an aminoazo compound selected from the group consisting of aminoazo compounds of the benzene, naphthalene, pyrene, pyrazolone and acetoacetylamide series, containing from one to three azo groups, one to four water-solubilizing groups, and zero to two metal atoms selected from the group consisting of copper and nickel atoms, each said metal atom being present in the dyestuff molecule in the form of a complex

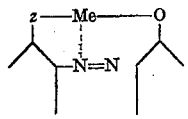

linkage, —z— being a member selected from the group consisting of

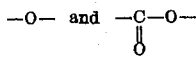

and Me representing the aforesaid metal atom, and wherein $x$ is a member selected from the class consisting of hydrogen and chlorine, and $y$ is a member selected from the class consisting of hydrogen and lower alkyl.

2. An azo dyestuff which corresponds to the formula

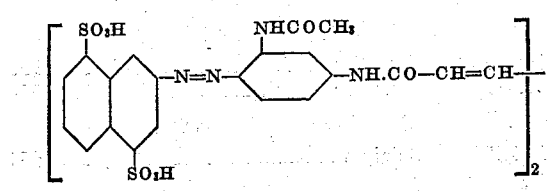

3. An azo dyestuff which corresponds to the formula

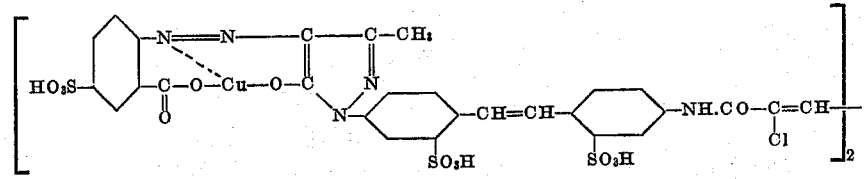

4. An azo dyestuff which corresponds to the formula

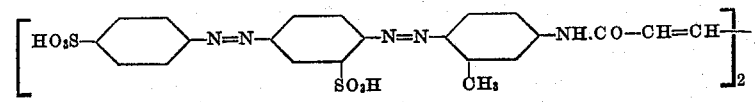

5. An azo dyestuff which corresponds to the formula

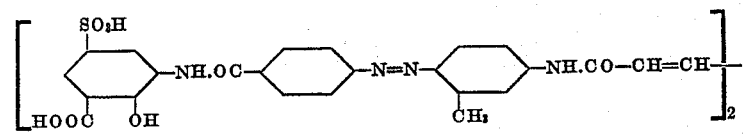

6. An azo dyestuff which corresponds to the formula

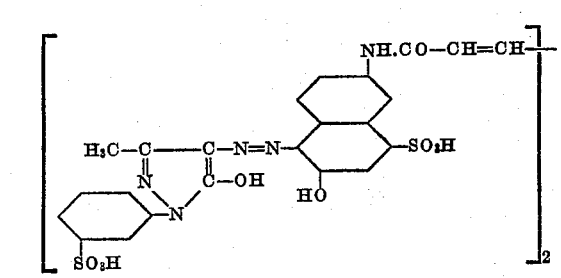

7. A process of preparation of dis- and polyazo dyestuffs comprising the steps of condensing, in an aqueous medium and in the presence of an acid binding agent, (a) two mols of aminoazo-compound selected from the group consisting of aminoazo compounds of the benzene, naphthalene, pyrene, pyrazolone and acetoacetylamide series, containing from one to three azo groups, one to four water-solubilizing groups, and zero to two metal atoms selected from the group consisting of copper and nickel atoms and (b) two mols of a mixture of two to three of said aminoazo compounds which are different from each other, with (c) one mol of a dicarboxylic acid halide which corresponds to the formula

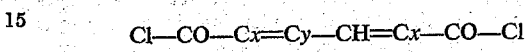

wherein $x$ is a member selected from the class consisting of hydrogen and chlorine, and $y$ is a member selected from the class consisting of hydrogen and lower alykyl, each metal being present in said aminoazo compounds in the form of a complex

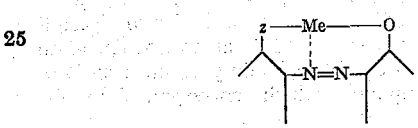

linkage, —z— being a member selected from the group consisting of

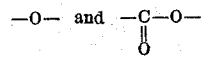

and Me representing the metal atom.

8. The process of preparation of a disazo dyestuff comprising the step of condensing, in an aqueous medium and in the presence of an acid binding agent, 2 mols of the aminoazo compound which corresponds to the formula

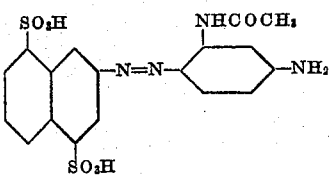

with 1 mol butadiene-1,4-dicarboxylic acid chloride.

9. The process of preparation of a disazo dyestuff comprising the step of condensing, in an aqueous medium and in the presence of an acid binding agent, 2 mols of the aminoazo compound which corresponds to the formula

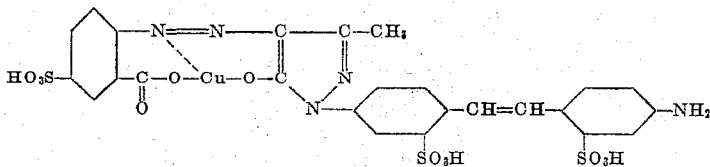

with 1 mol 1,4-dichlorobutadiene-1,4-dicarboxylic acid chloride.

10. The process of preparation of a tetrakisazo dyestuff comprising the step of condensing, in an aqueous medium and in the presence of an acid binding agent, 2 mols of the aminazo compound which corresponds to the formula

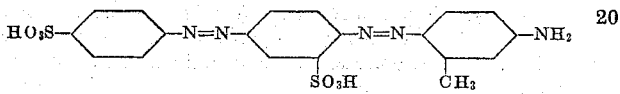

with 1 mol butadiene-1,4-dicarboxylic acid chloride.

11. The process of preparation of a disazo dyestuff comprising the step of condensing, in an aqueous medium and in the presence of an acid binding agent, 2 mols of the aminoazo compound which corresponds to the formula

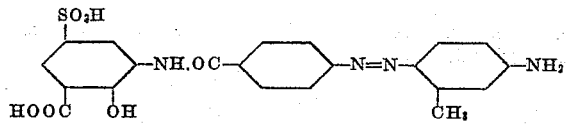

with 1 mol butadiene - 1,4 - dicarboxylic acid chloride.

12. The process of preparation of a disazo dyestuff comprising the step of condensing, in an aqueous medium and in the presence of an acid binding agent, 2 mols of the aminoazo compound which corresponds to the formula

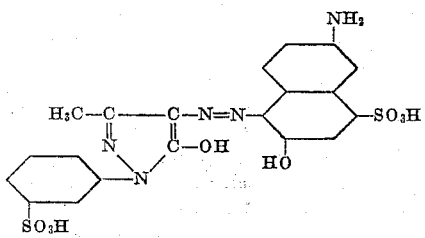

with 1 mol butadiene-1,4-dicarboxylic acid chloride.

References Cited in the file of this patent

UNITED STATES PATENTS

| | | |
|---|---|---|
| 2,646,338 | Kappeler et al. | July 31, 1953 |
| 2,673,198 | Grandjean et al. | Mar. 23, 1954 |

FOREIGN PATENTS

| | | |
|---|---|---|
| 504,489 | Belgium | July 31, 1951 |